US007392177B2

(12) United States Patent
Frank et al.

(10) Patent No.: US 7,392,177 B2
(45) Date of Patent: Jun. 24, 2008

(54) METHOD AND SYSTEM FOR REDUCING A VOICE SIGNAL NOISE

(75) Inventors: Walter Frank, München (DE); Marc Ihle, Ulm (DE)

(73) Assignee: Palm, Inc., Sunnyvale, CA (US)

( * ) Notice: Subject to any disclaimer, the term of this patent is extended or adjusted under 35 U.S.C. 154(b) by 701 days.

(21) Appl. No.: 10/492,434

(22) PCT Filed: Oct. 2, 2002

(86) PCT No.: PCT/DE02/03740

§ 371 (c)(1), (2), (4) Date: Apr. 12, 2004

(87) PCT Pub. No.: WO03/034407

PCT Pub. Date: Apr. 24, 2003

(65) Prior Publication Data

US 2004/0186711 A1 Sep. 23, 2004

(30) Foreign Application Priority Data

Oct. 12, 2001 (DE) ............................... 101 50 519

(51) Int. Cl.
*G10L 21/02* (2006.01)
*H04B 15/00* (2006.01)

(52) U.S. Cl. ........................ 704/205; 704/225; 704/226; 381/94.3; 381/94.7

(58) Field of Classification Search ................. 704/205, 704/225, 226, 227, 228, 233; 381/94.1, 94.2, 381/94.3, 94.7

See application file for complete search history.

(56) References Cited

U.S. PATENT DOCUMENTS 4,454,609 A * 6/1984 Kates ......................... 381/320
4,630,305 A 12/1986 Borth et al.
5,012,519 A * 4/1991 Adlersberg et al. ......... 704/226
5,305,307 A * 4/1994 Chu ........................... 370/288
5,649,052 A * 7/1997 Kim ........................... 704/226
5,764,698 A * 6/1998 Sudharsanan et al. ....... 375/241
5,839,101 A * 11/1998 Vahatalo et al. ............. 704/226
5,983,183 A * 11/1999 Tabet et al. ................. 704/270
6,175,602 B1 * 1/2001 Gustafsson et al. ......... 375/346
6,289,309 B1 * 9/2001 deVries ...................... 704/233
6,298,139 B1 * 10/2001 Poulsen et al. .............. 381/107
6,317,709 B1 * 11/2001 Zack .......................... 704/225
6,477,489 B1 * 11/2002 Lockwood et al. ....... 704/200.1
6,542,864 B2 * 4/2003 Cox et al. ................... 704/212
6,675,114 B2 * 1/2004 Ando et al. .................... 702/75
6,757,395 B1 * 6/2004 Fang et al. ................. 381/94.3

(Continued)

FOREIGN PATENT DOCUMENTS

WO WO 99/67774 12/1999

*Primary Examiner*—Martin Lerner
(74) *Attorney, Agent, or Firm*—Bell, Boyd & Lloyd LLP

(57) ABSTRACT

A method is provided whereby, before being subjected to a low rate voice coding, an incoming digital voice signal is chronologically segmented into blocks, the blocks are broken down respectively, in chronological order, into frequency components by a transformation in the frequency range and the frequency components are multiplied by weight factors depending on the frequency and modifiable in time, a frequency component being multiplied by the last weight factor calculated for the frequency component if the factor is less than the current weight factor.

6 Claims, 3 Drawing Sheets

U.S. PATENT DOCUMENTS 6,766,292 B1 * 7/2004 Chandran et al. ........... 704/224
6,999,920 B1 * 2/2006 Matt et al. .................. 704/215
7,013,266 B1 * 3/2006 Berger ........................ 704/203
7,020,605 B2 * 3/2006 Gao ........................... 704/225

* cited by examiner

METHOD AND SYSTEM FOR REDUCING A VOICE SIGNAL NOISE

BACKGROUND OF THE INVENTION

The present invention relates to a method and a system for voice processing; in particular, for processing noise in a voice signal.

The incredible pace of technical development in the area of mobile communication has led to constantly increasing demands on voice processing in recent years; particularly voice encoding and noise suppression. This is attributable in no small measure to the restricted availability of bandwidth and constantly increasing demands on voice quality.

A major component of voice processing includes estimating the noise signal or interference by which, for example, a voice signal captured by a microphone is normally affected and, if necessary, suppressing it in the input signal so as to only transmit the voice signal where possible. However, with conventional methods of noise suppression, undesired artifacts, also referred to as musical tones, are frequently produced in the background signal.

An object of the present invention, therefore, is to provide a technical template which allows high quality voice transmission at a low data rate.

SUMMARY OF THE INVENTION

The present invention is, thus, directed toward multiplying the frequency components of a voice signal affected by a noise signal before encoding with a low-rate voice codec by frequency-dependent weighting factors which change over time, where a frequency component is multiplied by a current weighting factor if the current weighting factor is smaller than the weighting factor last calculated for the respective frequency component, and where a frequency component is multiplied by the weighting factor last calculated for such frequency component if the weighting factor last calculated is smaller than the current weighting factor. A low-rate voice codec here refers to, in particular, a voice codec which delivers a data rate which is less than 5 Kbits per second.

The above has the effect of attenuating a noise signal applied to a voice signal in such a way as to enable good-quality voice transmission with minimum use of computing and memory resources.

The present invention initially stems from the knowledge that when low-rate voice codecs are used, good voice quality only can be obtained if the artifacts, as already explained-above, are avoided or reduced as much as possible. This could be detected by using expensive simulation tools created separately for such purpose.

The present invention further stems from the knowledge that, as expensive simulations also-show, by specific use of current or recently calculated weighting factors, artifacts in the background signal, particularly during voice pauses, are reduced.

This advantageous effect of the present invention, that is the combination of a specific method for noise suppression with a low-rate voice codec, which delivers a data rate that lies between 3 Kbits per second a 5 Kbits per second, has been confirmed by comprehensive simulations.

Additional features and advantages of the present invention are described in, and will be apparent from, the following Detailed Description of the Invention and the Figures.

DETAILED DESCRIPTION OF THE INVENTION

Figure 1:
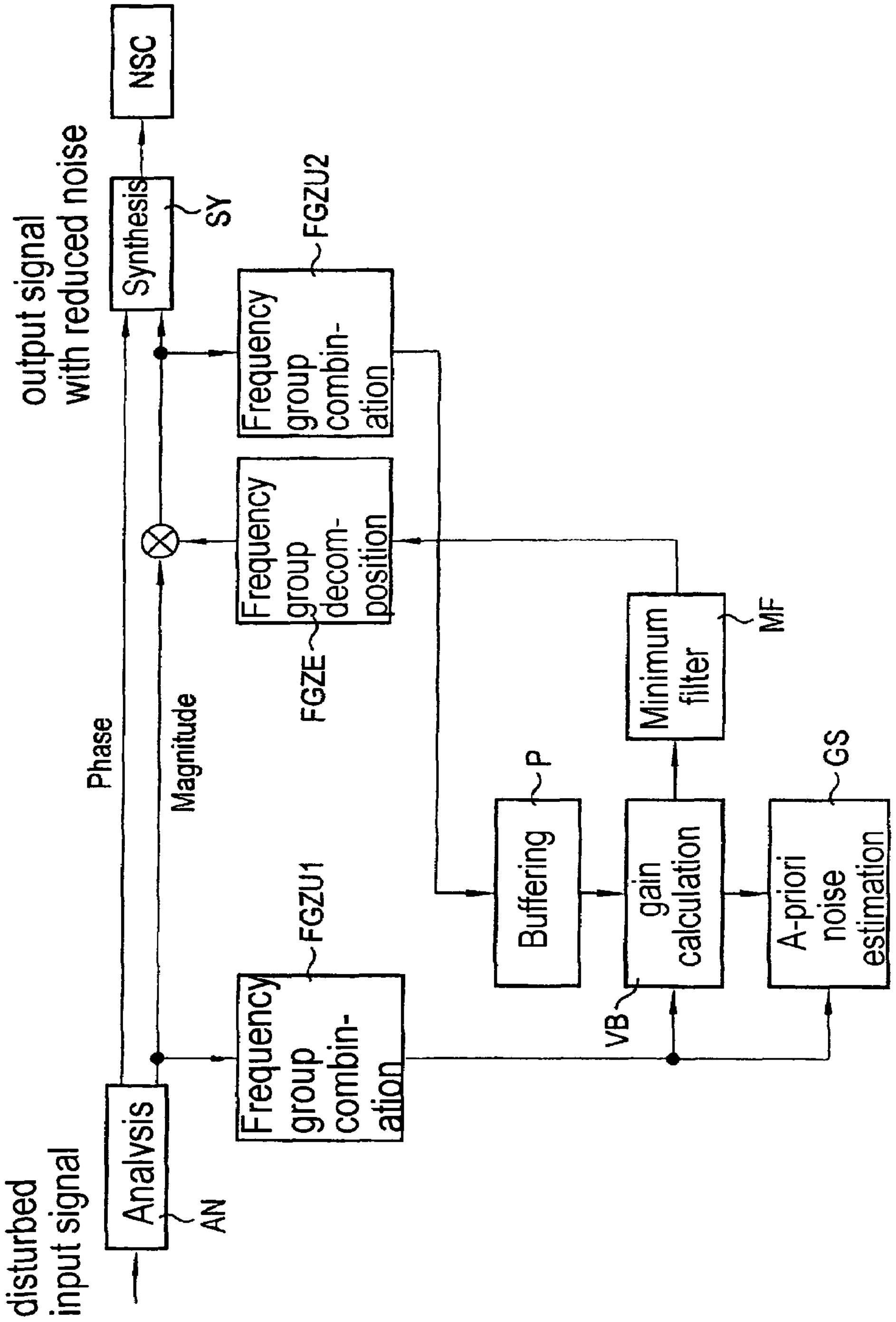
FIG. 1 shows a simplified block diagram of a method for voice processing.

FIG. 1 shows a block diagram of a method for voice processing. This method can be roughly divided into the inter-operating blocks noise suppression and downstream low-rate voice codec NSC. A low-rate voice codec, delivering a data rate of 4 Kbits per second, for example, is known per se, and thus will not be described in any greater detail at this point.

The method for noise suppression can be subdivided into a number of functional blocks, which are explained below.

The blocks Analysis AN and Synthesis SY form the frame of the method for noise suppression. A segmentation of the input signal undertaken prior to an analysis AN (not shown in FIG. 1) as well as the block sizes used are tailored to the low-rate voice codec in such a way that the algorithmic delay of the signal caused by the noise suppression remains as small as possible. The input signal x(k) is segmented, for example, into blocks of 20 ms at a sample rate of 8 kHz. The processed data also can be passed on to the voice codec in segments with the specified block length.

The analysis AN in this case may include a windowing, zero-padding and a transformation in the frequency range through a Fourier transformation, and the synthesis SY may include a back transformation by an inverse Fourier transformation in the time range and a signal reconstruction in accordance with the Overlap Add Method.

The frequency components obtained from the analysis AN feature a real and an imaginary part or, respectively, a magnitude and a phase. To save effort, the magnitudes of different adjacent frequency components are first combined into frequency groups on the basis of a Bark table FGZU1.

For each frequency group, a gain calculation VB is executed on the basis of an A-priori and an A-posteriori signal-to-noise ratio which results in weighting factors for the magnitudes of the individual frequency groups. The A-priori signal-to-noise ratio can be derived from the power density spectrum of the disturbed input signal and the A-priori noise estimation GS. The A-posteriori signal-to-noise ratio can be calculated from the power density spectrum of the disturbed input signal and the output signal of a buffering P which, in turn, is directed to a corrected frequency component combined by a frequency group combination FGZU2.

Before a decomposition FGZE of the frequency components previously combined into frequency groups and the multiplication of the frequency components by the weighting factor calculated for a corresponding frequency group in each case for noise suppression, the weighting factors are subjected to what is known as a minimum filter MF which will be explained in more detail later on the basis of FIG. 2.

Thus, for noise estimation the power density of the background noise is basically estimated from the input signal. To reduce the computing power needed as well as memory used, the A-priori noise estimation, the gain calculation, the buffering of the signal magnitude modified for noise signal suppression and the minimum filter are only executed in a few subbands. For this, the magnitude of the input signal transformed in the frequency range and of the signal modified for noise suppression are combined with two blocks for frequency group combination into subbands. The width of the subbands is oriented in this case to the Bark scale and thus varies with the frequency. The output signal of each frequency group of the minimum filter is distributed by the block frequency group decomposition to the corresponding frequency components or Fourier coefficients. To calculate the input signal of the buffering block, in another embodiment the combined magnitude of the input signal can be multiplied element-by-element with the output signal of the minimum filter instead of a frequency group combination of the signal modified for noise signal suppression.

In addition to noise estimation, there is an A-posteriori estimation of the voice signal proportion. For this, the signal combined into frequency groups of the modified magnitude values for noise reduction is stored in the buffering block. The output signals of the A-priori noise estimation and the buffering are used in addition to the magnitude value of the input signal combined into frequency groups for calculation of the gain. Weighting factors result from the gain calculation and are fed to a minimum-filter, which is explained in more detail below. The minimum filter finally determines the weighting factors provided for multiplication with the frequency components of the frequency groups.

Figure 2:
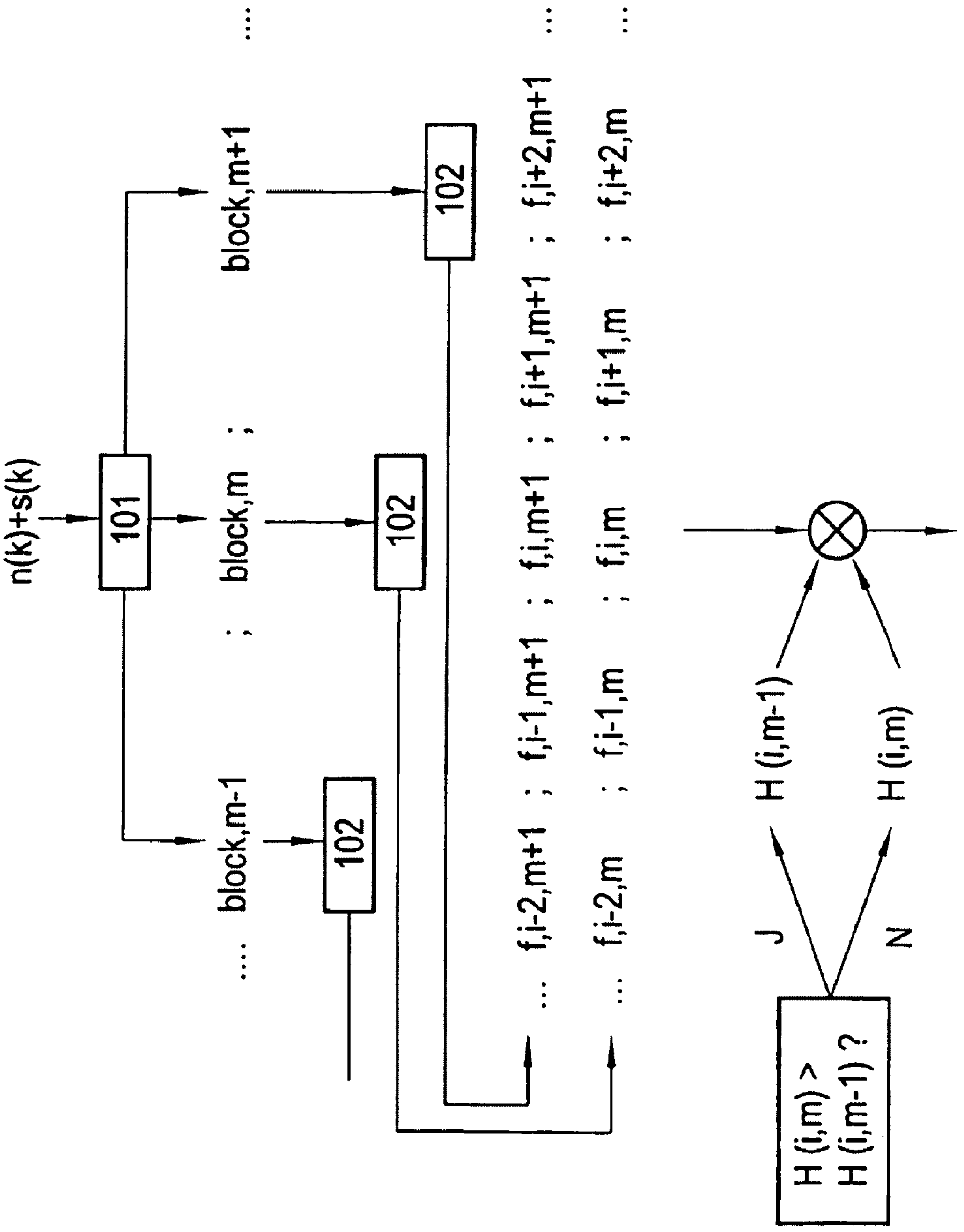
FIG. 2 shows a flowchart of a method for noise suppression.

Using the flowchart as shown in FIG. 2, a simplified embodiment variant for noise suppression of a voice signal will now be explained in more detail. In this case, the frequency group combination blocks FGZU1, FGZU2 shown in FIG. 1 and frequency group decomposition are not used.

Disturbed voice signals picked up by a microphone are converted by a sampling unit and an analog/digital converter connected downstream from it into an incoming digital voice signal s(k) affected by disturbances n(k). This input signal is segmented chronologically into blocks (block, m) (101) and the blocks (block, m) are mapped in chronological order by a transformation into the frequency range to i frequency components f(i,m) in each case (102), with m representing the time and i the frequency. This can be done by a Fourier transformation, for example. If the Fourier coefficients of the input signal are identified by X(i,m), the values |X(i,m)|^2 can be identified as frequency components.

The frequency components of a voice signal f(i,m) are multiplied in accordance with the segmentation 101 explained above and transformation into the frequency range 102 by a weighting factor H(i,m), with the weighting factor, for example, being able to be derived from the estimated A-priori and A-posteriori signal-to-noise ratios already explained above. The A-priori signal-to-noise ratio can be derived from the power density spectrum of the disturbed input signal and the A-priori noise estimation. The A-posteriori signal-to-noise ratio can be calculated from the power density spectrum of the disturbed input signal and the output signal of the buffering.

The frequency or frequency component-dependent weighting factor is, in this case, modifiable over time and is determined so that it is continuously updated to correspond to the chronologically modifiable frequency components. To avoid undesired artifacts in the background signal, however, for implementation of a minimum filter for multiplication by a frequency component f(i,m), the weighting factor H(i,m) currently calculated for such frequency component is not always included but only when the weighting factor last calculated for this frequency component, that is in the previous step H(i,m−1), is smaller than the current weighting factor last calculated, that is in the previous step for this frequency component H(i,m−1).

One embodiment of the present invention provides for a frequency component to be multiplied by the current weighting factor when the frequency-dependent weighting factor lies above a threshold value, even if the last weighting factor calculated for this frequency component is smaller than the current weighting factor.

Such embodiment may be implemented by a filter which compares the current weighting factor with the chronologically previous weighting factor for the same frequency in each case and selects the smaller of the two values for application to the frequency component. If the fixed threshold value of 0.76 is exceeded by the current weighting factor, there is no modification of the frequency component.

Figure 3:
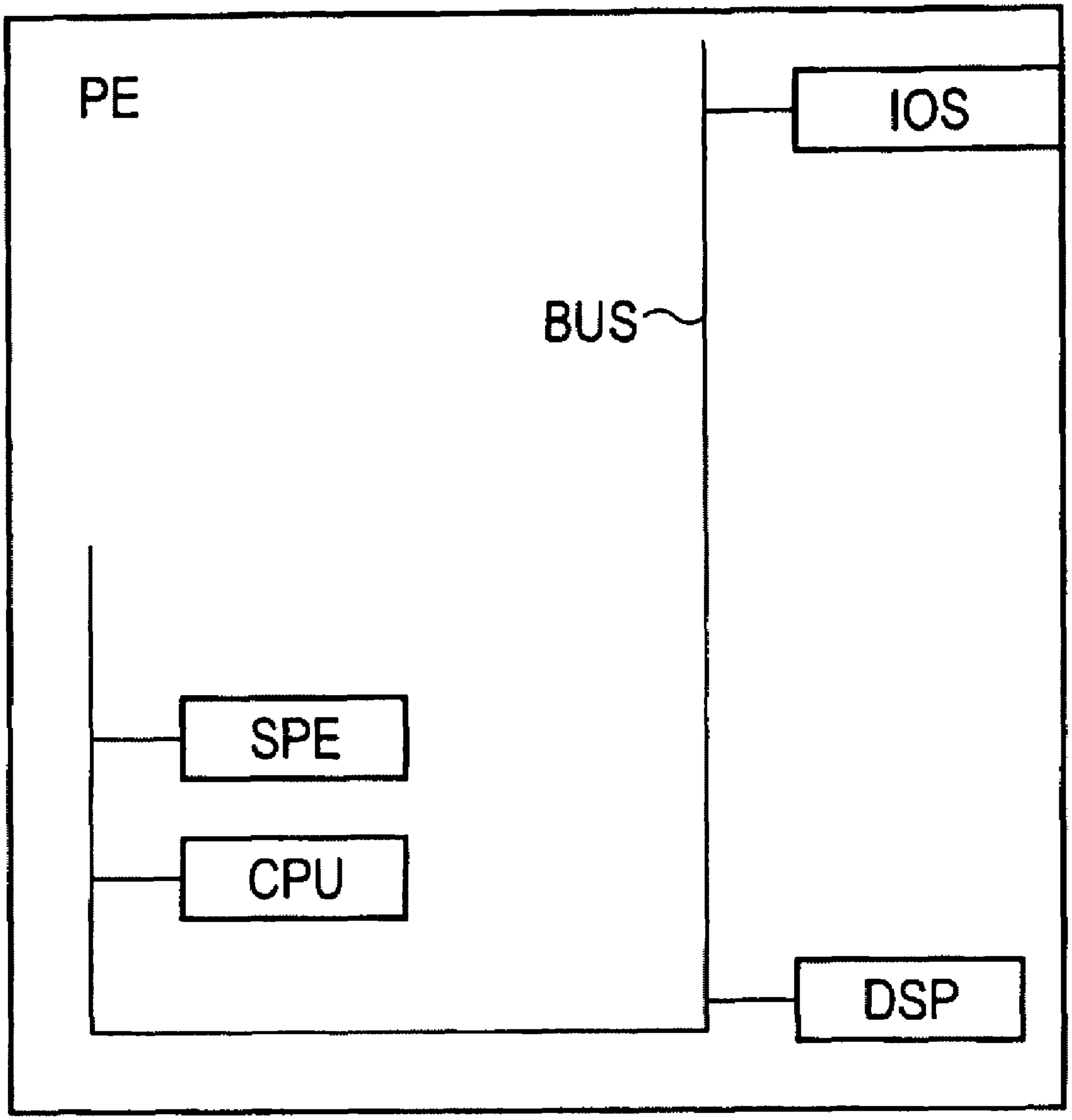
FIG. 3 shows a simplified block diagram of a system for voice processing.

FIG. 3 shows a programmable processor unit PE such as a microcontroller, for example, which also can may include a processor CPU and a memory unit SPE.

Depending on the embodiment, further components may be arranged within or outside the processor unit PE, which are assigned to the processor unit, belong to the processor unit, controlled by the processor unit or controlling the processor unit, of which the function in conjunction with the processor unit is sufficiently known to an expert in this field and thus will not be described in any greater detail at this point. The various components may exchange data with the processor unit PE via a bus system BUS or input/output interfaces IOS and, where necessary, suitable controllers (not shown). In such cases, the processor unit PE may be an element of an electronic device such as an electronic communication terminal or a mobile telephone, and may control other specific methods and applications for the electronic device.

Depending on the embodiment, the memory unit SPE, which also may include one or more volatile RAM or ROM memory modules, or parts of the memory unit SPE can be implemented as part of the processor unit (shown in FIG. 4) or implemented as an external memory unit (not shown in FIG. 4), which is localized outside the processor unit PE or even outside the device containing the processor unit PE and is connected to the processor unit PE by lines or a bus system.

The program data which is included for controlling the device and method of voice processing and for noise signal suppression is stored in the memory unit SPE. Implementing the above-mentioned functional components by programmable processors or by microcircuits provided separately for this purpose is within the knowledge of experts in this field.

The digital voice signals affected by disturbance may be fed to the processor unit PE via the input/output interface IOS. In addition to the processor CPU, a digital signal processor DSP may be provided to execute all or some of the steps of the method explained above.

Although the present invention has been described with reference to specific embodiments, those of skill in the art will recognize that changes may be made thereto without departing from the spirit and scope of the present invention as set forth in the hereafter appended claims.

The invention claimed is:

1. A method for voice processing, comprising:

segmenting an incoming digital voice signal chronologically into blocks;

mapping the blocks in chronological order, by a transformation in a respective frequency range, onto respective frequency components;

multiplying the frequency components by chronologically modifiable frequency-dependent weighting factors derived from estimated a-priori and a-posteriori signal-to-noise ratios having a plurality of values, wherein:

a respective frequency component is multiplied by a current weighting factor if the current weighting factor is smaller than a weighting factor last calculated for the frequency component, and the frequency component is multiplied by the weighting factor last calculated for the frequency component if the weighting factor last calculated is smaller than the current weighting factor, and feeding the weighted frequency components back, after a back transformation in a respective time range, to a low-rate voice codec; and wherein the a-priori signal-to-noise ratio is defined as a power density spectrum of the incoming digital voice signal and an a-priori noise estimation, and the a-posteriori signal-to-noise ration is defined as the power density spectrum of the incoming digital voice signal and an output signal of a buffering.

2. A method for voice processing as claimed in claim 1, wherein a respective frequency component is multiplied by the current weighting factor if the respective frequency-dependent weighting factor lies above a threshold value.

3. A method for voice processing as claimed in claim 1, wherein a respective frequency component is multiplied by the current weighting factor if the current weighting factor lies above a threshold value, and if the weighting factor last calculated for the frequency component is smaller than the current weighting factor.

4. A system for noise suppression, comprising:

an input for digital voice signals; and a processor unit for chronologically segmenting an incoming digital voice signal into blocks, for mapping the blocks in chronological order, by a transformation in a respective frequency range, onto respective frequency components, for multiplying the frequency components by chronologically modifiable frequency-dependent weighting factors derived from estimated a-priori and a-posteriori signal-to-noise ratios having a plurality of values, wherein a respective frequency component is multiplied by a current weighting factor if the current weighting factor is smaller than a weighting factor last calculated for the frequency components, the frequency component is multiplied by the weighting factor last calculated for the frequency component if the weighting factor last calculated is smaller than the current weighting factor, and for feeding the weighted frequency components back, after a back transformation in a respective time range, to a low-rate voice codec, the a-priori signal-to-noise ratio is defined as a power density spectrum of the incoming digital voice signal and an a-priori noise estimation, and the a-posteriori signal-to-noise ration is defined as the power density spectrum of the incoming digital voice signal and an output signal of a buffering.

5. A system for noise suppression as claimed in claim 4, wherein a respective frequency component is multiplied by the current weighting factor if the respective frequency-dependent weighting factor lies above a threshold value.

6. A system for noise suppression as claimed in claim 4, wherein a respective frequency component is multiplied by the current weighting factor if the current weighting factor lies above a threshold value, and if the weighting factor last calculated for the frequency component is smaller than the current weighting factor.

* * * * *